United States Patent [19]

Vroman et al.

[11] Patent Number: 5,385,675
[45] Date of Patent: Jan. 31, 1995

[54] METHOD FOR OIL SPILL DISPERSION

[75] Inventors: Albert L. Vroman; Pamela K. Benner; Shelly A. Stedman, all of Portland, Mich.

[73] Assignee: Zing Odor Control, Inc., Portland, Mich.

[21] Appl. No.: 81,224

[22] Filed: Jun. 25, 1993

[51] Int. Cl.⁶ .................................................. C02F 1/40
[52] U.S. Cl. ..................................... 210/728; 210/729; 210/925
[58] Field of Search ............... 210/725, 727, 728, 729, 210/749, 925

[56] References Cited

U.S. PATENT DOCUMENTS

| | | | |
|---|---|---|---|
| 3,998,733 | 12/1976 | Blanchard et al. | 210/925 |
| 4,469,603 | 9/1984 | Lepain et al. | 210/749 |
| 4,502,975 | 3/1985 | Kobayashi et al. | 210/925 |

OTHER PUBLICATIONS

Kirk-Othmer 21, 332-432 (1983).
Kirk-Othmer 8, 900-929 (1979).

*Primary Examiner*—Peter A. Hruskoci
*Attorney, Agent, or Firm*—Ian C. McLeod

[57] ABSTRACT

A method and composition for dispersing oil spills, wherein methyl benzoate and a surfactant is used to disperse the oil is described. In particular, the present invention relates to a method and compositions wherein the surfactant is a biodegradable detergent.

8 Claims, No Drawings

METHOD FOR OIL SPILL DISPERSION

BACKGROUND OF THE INVENTION

1. Field of the Invention

The present invention relates to compositions which are useful for an dispersing oil spill with water. In particular the present invention relates to compositions which contain methyl benzoate admixed with a surfactant which causes the oil to coalesce in water and form particles when the composition is applied to the oil spill.

2. Description of Related Art

Methyl benzoate in an aqueous solution is sold commercially under the trademark ZING by Zing Agricultural Product Applications, Inc., Portland, Mich., for odor control in sewage and livestock manure. An emulsifier, which is a non-toxic detergent, is present in the composition in very small amounts which allows the methyl benzoate to be mixed with water. This product is also used to dissolve and control grease, sludge, soap and detergent deposits particularly in drains and sink traps. It is approved under EPA regulations and is considered safe for use in =he environment in low concentrations.

There is a general problem in cleaning up oil spills. It would be very useful to accomplish this using water to wash away the oil. However, oils are insoluble in water and thus water alone is not effective for this purpose.

The problem of oil spills in a body of water has defied any simple solutions. Generally skimmers and other mechanical separators are used. Sometimes chemicals, such as surfactants, are used in an attempt to disperse the oil. In this event, the oil merely sinks to the bottom of the body of water to produce a film which causes damage to marine life. If the spill floats on the surface of the body of water and reaches a shoreline the result is extensive damage to marine life, particularly birds and mammals, which are at the shoreline.

OBJECTS

It is therefore an object of the present invention to provide a method and compositions which convert the oil to particles in the water. It is particularly an object of the present invention to provide a method and compositions which can be applied to a body of water to disperse an oil spill on the water and to form particles in the water which can be degraded by microorganisms in the water without forming an oil film on the marine life. It is further an object of the present invention to provide compositions which will not damage the environment. Further still, it is an object of the present invention to provide compositions which are inexpensive to prepare. These and other objects will become increasingly apparent by reference to the following description.

DESCRIPTION OF THE PREFERRED EMBODIMENTS

The present invention relates to a method for treating an oil spill with water which comprises: applying a composition containing effective amounts of a mixture of methyl benzoate and a surfactant to the oil so that the oil coalesces in the water as particles.

The present invention relates to a method for treating an oil spill on a surface of a body of water which comprises: applying a composition containing effective amounts of a mixture of methyl benzoate and a surfactant with water to the oil so that the oil coalesces in the water and then sinks in the body of water.

Further, the present invention relates to a composition useful for treating oil spills with water which comprises: (a) methyl benzoate; and (b) a surfactant wherein the volume ratio of (a) to (b) is between about 10 to 1 and 1 to 10, wherein the oil coalesces in the water.

A surfactant is a surface active agent. Generally it is an organic compound which has an attraction for water at one end and oil at the other end and in the case of the present invention produces an oil in water emulsion. The surfactants can be anionic, non-ionic or cationic. A discussion of surfactants appears in Kirk-Othmer 21 332–432 (1983). An extensive discussion of surfactants which provide emulsifiers appears in Kirk Othmer 8 900–929 (1979). Preferably the surfactants used in the present invention have a hydrophile-lipophile balance (HLB) of about 6 to 19 out of a possible 20.

The preferred surfactants are detergents such as the alkylarene sulfonates. The surfactant is used in a ratio of aqueous methyl benzoate emulsion composition to surfactant by volume of between about 1 to 10 and 10 to 1. The aqueous composition contains between about 1 and 100 and 1 to 4 parts by volume of methyl benzoate to water.

The method of application to the oil spill is variable. Preferably the composition is applied as an aerosol by airplane to a body of water if the oil slick or spill is large. Smaller spills can be treated using a sprayer. Numerous methods of application to the oil will occur to those skilled in the art. The amount applied is preferably between about 0.01 and i part by volume per part of oil.

The formulation in the following examples has three (3) parts of methyl benzoate with two (2) parts dishwashing detergent by volume as an surfactant or emulsifier.

COMPARATIVE EXAMPLE 1

The commercial ZING formulation was applied directly to 1 ounce (29.6 cc) of used motor oil floating on 8 ounces (236.6 cc) of water in a glass jar. The formulation broke the oil apart but did not produce acceptable results, since the oil still adhered to the container.

COMPARATIVE EXAMPLE 2

DAWN$v$ liquid dish detergent, which is biodegradable (Proctor & Gamble, Cincinnati, Ohio), was used alone in an amount of one (1) oz (29.6 cc) to one ounce (29.6 cc) of motor oil to see what effect it would have on the used motor oil. The detergent made soapy water, but left the oil on the bottom and at the sides of the glass jar.

EXAMPLE 3

Three (3) parts by volume of the aqueous composition of methyl benzoate of Example 1 was used with two (2) parts by volume of PALMOLIVE dish detergent to form a new composition. The amount of detergent added, completely masked the emulsifier present in the aqueous emulsion. The composition was then applied to used oil. One ounce (29.6 cc) of used motor oil was provided in 8 ounces (236.6 cc) of water in a glass gar as in Example 1. The jar was shaken to mix the oil with the water to the extent it would mix. One squirt of the methyl benzoate composition with the detergent was applied from an atomizer spray bottle (approximately ½ ounce or 14.7 cc) to the oil/water mixture.

This amounts to 0.5 part of the composition per part of the oil by volume (50% of the volume of the oil). The formulation broke up the oil into particles. As the oil and formulation were shaken together, the oil dissipated in the water and to a consistency where a residue was easily washed away or wiped off the jar.

EXAMPLE 4

Two (2) ounces (56.6 gram) of sand was placed in a glass jar and 1 ounce (29.6 cc) of used motor oil and allowed to stand for about 10 minutes to let the oil soak into the sand. This mixture was sprayed with one squirt (approximately ½ ounce or 14.7 cc) of the formulation of Example 3 from the atomizer spray bottle and let stand for about ten (10) minutes. Six (6) ounces of water was added to the jar. The sand mixture was rinsed with water twice. The oil was dissipated in and removed with the water. In a similar experiment the mixture was shaken to represent the washing motion of water on the sand. The water became grayish and the thick oil gradually disappeared. When the bottle was emptied, the sand was clean, after two or three rinsings.

EXAMPLE 5

Example 3 was repeated with 2 ounces (56.6 gram) of peastone rather than 2 ounces of sand. The results were the same as in Example 3.

EXAMPLE 6

Fifteen (15) pounds (5.6 kilograms) of sand and five (5) pounds (1.8 kilograms) of peastone were placed in a 10 gallon aquarium which measured 1 foot by 2 feet (30.5 cm by 61 cm). Two (2) gallons (7.56 liters) of water was added, leaving part of the sand exposed above the water level. One (1) live goldfish and one live seaweed plant was placed in the water. One-quarter (¼) cup of used motor oil was added, part on the water and part on the sand, and part on the seaweed. Four (4) drops of the composition of Example 3 was added in four places on the surface of the oil. The aquarium was moved to create a wave motion in the water. The composition began to break down the oil, and the wave motion began to dissipate the oil from the four locations where it had been applied. As the composition mixed with the water and oil, it turned the water gray and began to wash the sand. The washing motion on the sand began to clean the sand. The oil that remained turned to particles when it dried on the sand and peastone. The seaweed became clean from the washing motion. There was no apparent adverse effect on the seaweed nor the goldfish. After about two hours at rest, the particles of the oil started settling out from the water, and eventually the water became clear. The oil particles settled to the bottom of the aquarium.

The bad odor of the used motor oil was no longer present after application of the composition of Examples 3 to 6. No heating of the water or the oil was necessary for the composition to be effective. The oil particles dissipated and settled to the bottom of the aquarium in Example 6. In some of the experiments a slight residue appeared on the surface of the water, but this was not an oily residue. Thus residue could be skimmed off the surface of the water.

The methyl benzoate and surfactant can be applied separately or together. They can be applied with or without water and then water can be supplied. For large oil spills on a body of water, a mixture of the methyl benzoate and the surfactant alone are sufficient. Generally for reasons of economy of application an aqueous composition, including the methyl benzoate and surfactant, is applied to the oil spill.

It is intended that the foregoing description be only illustrative of the present invention and that the present invention be limited only by the hereinafter appended claims.

We claim:

1. A method for treating an oil spill in water which comprises:
    applying a composition consisting essentially of effective amounts of a mixture of methyl benzoate and a surfactant to the oil spill so that the oil coalesces in the water as particles and sinks, wherein the volume ratio of methyl benzoate to surfactant is between about 1 to 10 and 10 to 1.

2. The method of claim 1 wherein the surfactant is a liquid detergent.

3. The method of claim 1 wherein the volume ratio of the composition to oil is between about 0.01 and 1 to 1.

4. The method of claim 1 wherein the composition is applied as an aerosol.

5. A method for treating an oil spill on a surface of a body of water which comprises:
    applying a composition consisting essentially of effective amounts of a mixture of methyl benzoate and a surfactant to the oil spill so that the oil coalesces in the water and then sinks in the body of water, wherein the volume ratio of methyl benzoate to surfactant is between about 1 to 10 and 10 to 1.

6. The method of claim 5 wherein the surfactant is a liquid detergent.

7. The method of claim 5 wherein the volume ratio of composition to oil is between about 0.01 and 1 and 1.

8. The method of claim 5 wherein the composition is applied as an aerosol.

* * * * *